United States Patent [19]

Lippe et al.

[11] 4,407,747

[45] Oct. 4, 1983

[54] CONTINUOUS METHOD FOR DISSOLVING MILK PROTEINS CONTAINING CASEIN AND AN APPARATUS FOR PERFORMING THE METHOD AS WELL AS WATER SOLUBLE MILK PROTEIN PRODUCTS OF A NOVEL TYPE

[75] Inventors: Frank Lippe, Veghel; Henricus A. W. E. M. Ottenhof; Rudolf De Boer, both of Wageningen, all of Netherlands

[73] Assignee: Stichting Nederlands Instituut Voor Zuivelonderzoek (NIZO), Netherlands

[21] Appl. No.: 201,419

[22] Filed: Oct. 28, 1980

[30] Foreign Application Priority Data

Aug. 13, 1980 [NL] Netherlands ................. 8004587

[51] Int. Cl.$^3$ .............................................. A23J 1/20
[52] U.S. Cl. .................................. 260/120; 260/119; 260/112 R; 426/657
[58] Field of Search ............... 260/120, 112 R, 119; 426/657, 580

[56] References Cited

U.S. PATENT DOCUMENTS 3,389,131  6/1968  Van Horn ..................... 260/120

FOREIGN PATENT DOCUMENTS 7602908  3/1976  Netherlands .
7809528  9/1978  Netherlands .
1527041  10/1978  United Kingdom .

OTHER PUBLICATIONS

A. Bergmann, J. Dairy Tech., vol. 25, No. 2, pp. 89–91.

Dairy Sci. Abst. E. Gwozdz, Technique Lettre (1977) No. 912, 19–21, 23–24.
"Caseines–Caseinates" by E. Gwozdz., Congres Int. de Lalterie, Paris, (1978).
"New Method of Continuous Casein Manufacture", by Gwozdz et al., p. 419.
Smith, D. R., Australian J. Dairy Tech., vol. 23, pp. 8–14, Mar. 1968.

Primary Examiner—Allan Lieberman
Assistant Examiner—Patricia Short
Attorney, Agent, or Firm—Hopgood, Calimafde, Kalil, Blaustein & Judlowe

[57] ABSTRACT

Continuous method for dissolving milk proteins containing water insoluble casein by passing said milk proteins together with one or more solubilizers and with water in a continuous stream through a closed reaction chamber by means of a positive displacement pump and converting the mixture within said reaction chamber under the influence of shearing forces into a solution having a dry solids content within the range of from 20 to 70% by weight. The solution can be removed from the reaction chamber as liquid jets which are dried while forming endless threads or films which can be cut or milled. Water soluble milk protein product having a particle density amounting to at least 90% of the specific density. Apparatus for performing said method containing a positive displacement pump and a closed reaction chamber connected to said pump by way of the discharge conduit of said pump, in which reaction chamber preferably a rotary means, such as a colloid mill or a serrated impeller, is provided.

17 Claims, 1 Drawing Figure

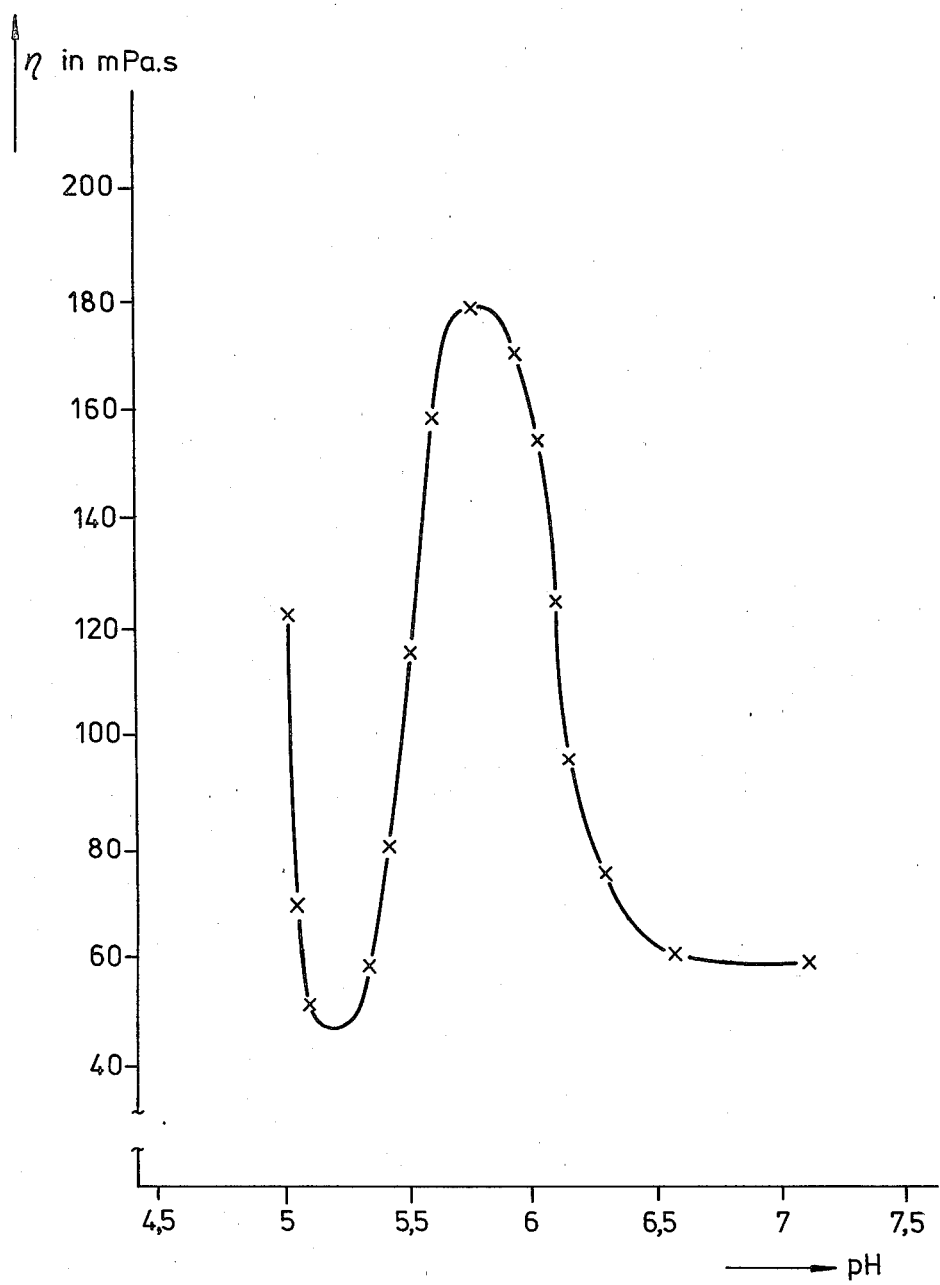

CONTINUOUS METHOD FOR DISSOLVING MILK PROTEINS CONTAINING CASEIN AND AN APPARATUS FOR PERFORMING THE METHOD AS WELL AS WATER SOLUBLE MILK PROTEIN PRODUCTS OF A NOVEL TYPE

The invention relates to a continuous method for dissolving milk proteins containing casein, to an apparatus for performing such a method and to water soluble milk protein products of a new type.

Milk proteins are obtained in general from milk or other liqids derived from milk by precipitation caused by the action of enzymes, by heat and/or the addition of acids and/or salts. The precipitates thus obtained having a relatively high water content are called curds, which curds dependent on the method of preparation and the further working-up thereof, are distinguished into cheese curd, quark curd as well as acid casein curd, rennet casein curd, coprecipitate curd or the like. (By coprecipitate one understands in this connection a precipitate formed from a combination of casein, albumin and globulin). The curd may be washed and dried whereby a water insoluble milk protein product is obtained.

For a number of applications, e.g. in the food industry, in the production of glue or in the treatment of paper, it is, however, desired that milk proteins are available in a dissolved or in a water soluble form. In this connection a mixture of water and soluble milk proteins having a dry solids content up to 70% by weight is considered to be a solution. Dependent on the temperature this solution has the appearance of a sol or a gel. In the physical-chemical sense such dispersions, it is true, are not alway indentical with a true solution though they are called a solution because the colloidal particles do not show the propensity to settle. If a mixture of water and soluble milk proteins has a dry solids content of more than 90% by weight the mixture is considered to be a dry product.

For imparting a soluble character to milk proteins these proteins are treated with solubilizers. From the Dutch patent application 76 02908 e.g. a method is known in which a casein suspension in an aqueous medium containing casein in an amount of at most 270 g per liter is aged for at least 10 minutes, whereupon a solubilizer is gradually added to this suspension until a homogeneous solution is obtained. By ageing there is understood a maximum hydration of the casein before the solubilizer is added. Dependent on the type of milk protein and the envisaged use thereof bases and/or alkaline reacting or complex forming salts of alkali metals and/or alkaline earth metals and/or corresponding ammonium compounds are utilized as solubilizers. As examples thereof sodium, potassium, ammonium and calcium hydroxide, carbonate and hydrogen carbonate, borax, sodium or potassium citrate, phosphate and polyphosphate are mentioned.

As indicated in the Dutch patent application No. 76,02908 the maximum casein content in the suspension amounts to 27% by weight though in practice a content of 25% by weight will not be surpassed because the solutions obtained would otherwise become much too viscous for processing the same without difficulty. The increase in viscosity in this known treatment of casein suspensions is related to the swelling of the protein particles subject to dissolution. When these particles are dissolved there will be a decrease in viscosity. Because the viscous suspensions or solutions, respectively, have to be stirred vigorously and because the dissolved proteins have a relatively high emulsifying capacity there wll also occur an incorporation of air causing an increase of the viscosity. In addition, because the curd derived from the milk will usually have a dry solids content of 30–50% by weight, there has to be added an appreciable amount of water in order to keep the suspension in a processable condition, which added water has to be removed again at a later stage.

From the Journal of the Society of Dairy Technology 25 (1972), pages 89–91 a continuous method for transforming casein into a sodium caseinate solution is known in which an aqueous suspension of casein curd is passed through a colloid mill by means of a pump, whereby the curd particles are subject to a size reduction in said colloid mill. After this milling operation sodium hydroxide is added to the thick paste-like particles suspension and blended therewith causing the casein to dissolve. Viscosity problems cause the dry solid content of solution prepared according to this method to be restricted to about 20% by weight.

From the Dutch patent application No. 78,09528 a method is known in which a blend comprising milk protein, a solubilizer and one or more compounds capable of generating an inert gas under the conditions of pressure and temperature within an extrusion apparatus, is passed through an extrusion apparatus at elevated temperature, said blend being caused to expand freely at the outlet thereof to form a foamed dimensionally stable extruded shape having an specific weight of at most 0.4 $g/cm^3$ which extruded shape is optionally subjected to a final drying operation and/or a size reduction. Before the extrusion operation the blend preferably has a water content of from 13 to 27% by weight and after the extrusion operation a water content of from 8 to 10% by weight. As the solubilizing and also inert gas generating compound it is preferred to use an alkali metal carbonate or hydrogen carbonate. In view of the high dry solids contents this method cannot be considered as a method for preparing milk protein solutions.

From a contribution by E. Gwozdz to the XX Congres International de Laiterie, Paris 1978, Sessions Scientifiques et Techniques, Caseines-Caseinates 51 ST, pages 5–12 it is known to extrude a casein curd having a dry solids content of from 40–50% by weight together with sodium carbonate as a powder or as an aqueous solution by means of an extrusion apparatus and to thus prepare sodium caseinate dispersions which may be dried thereafter in a special type of mill.

The extrusion apparatuses used in the above described known extrusion methods require, however, a very high consumption of energy due to the high viscosity of the milk protein suspensions processed therein as well as much supervision and maintenance.

The object of the invention is now to eliminate the drawbacks of the known methods and to impart a soluble character to milk proteins in a continuous method while forming a solution having a high dry solids content.

It has been found that the object of the invention may be realized if the milk proteins, the solubilizer(s) and the water are passed in a continuous stream through a closed reaction chamber by means of a positive displacement pump and the mixture is converted under the influence of shearing forces within said reaction chamber into a solution having a dry solids content within the range of from 20–70% by weight.

For some types of milk protein, like e.g. calcium coprecipitates, a dry solids content of more than 20% by weight is to be considered already as a high dry solids content. The method according to the invention is particularly beneficial if the method is applied to mixtures the dry solids content of which amounts to from 27-60% by weight. Therein the positive displacement pump should be capable to overcome the back pressure caused by the viscosity within the reaction chamber. This back pressure is dependent on the shape of the reaction chamber, the temperature within that chamber and the type and concentration of the milk protein as well as on the pH-value of the mixture as will be elucidated below in further detail.

As the positive displacement pump a usual pump of this type, such as a gear pump, a crew pump, a baffle pump, a mono- or rotary displacement pump or also an alternating pump having plungers, sleeves or diaphragms may be utilized. If the milk protein suspension is relatively concentrated a regular conveyance thereof may be promoted by utilizing a positive displacement pump having a connected feeding screw.

The shape of the reaction chamber may vary considerably although it will be preferred to choose a simple shape so that it may be cleaned and taken down easily. A cylindrical pipe having a suitable diameter and length is the most simple shape for realizing the required degree of shearing within the desired residence time. When selecting an appropriate shape of the reaction chamber and an appropriate flow velocity homogeneous solutions may be obtained shearing forces within the reaction chamber are exclusively generated by friction with respect to stationary surfaces. If a short length is required the required degree of shearing with respect to the stationary surfaces may be acquired by providing obstructions, such as baffles or other stationary mixing elements, within the reaction chamber of by increasing the ratio of the surface area to the capacity e.g. by designing the walls in a zigzag-shape or with a number of constrictions and expansions.

It may be advantageous to raise the temperature in the reaction chamber whereby the reaction rate is increased and the viscosity of the solution obtained is lowered and also less problems are experienced due to the temporary increase of the viscosity during the dissolution of the milk proteins. The raise of the temperature may be realized in a simple way by direct injection of steam. Of course, it is also possible to heat the reaction chamber in a indirect manner, e.g. by means of a jacket through which a liquid heating medium is passed or by means of electric heating spirals.

If the discharge from the reaction chamber possesses a fixed cross-section identical variations in viscosity within the reaction chamber will cause also variations in pressure and temperature within said reaction chamber. In many instances this will not be a serious problem for a proper progress of the process. If, however, a constant temperature is required indeed, for instance in case of products which are not stable to overheating or which should be heated exactly to a certain minimum temperature, a constant temperature may be maintained by steam injection if the discharge of the solution from the reaction chamber is governed by means of a pressure regulating system, for instance of a known type. For instance a pressure sensor may be mounted within the reaction chamber by means of which a throttle provided at the outlet of the reaction chamber is adjusted dependent on the pressure thus registered.

The adjustment of the temperature and of the residence time is important for causing the milk proteins to dissolve in a correct way and also for preventing the occurence of defects in odour, colour, taste and food value as may be caused by thermally catalyzed reactions of the proteins or the amino acids constituting said proteins, respectively. Lysino alanine as may be formed by the above mentioned reactions may not be detected in substantial quantities if for example a temperature of 80° C. during 120 seconds is applied. Solutions of a comparable quality may be prepared also by employing other combinations of temperature and residence time.

It is also possible to prepare and to sterilize the solution in one single operation if the flow velocity of the mixture within the reaction chamber is adjusted relative to the volume of the reaction chamber in such a manner that the residence time at a temperature above 120° C. within said reaction chamber becomes that long that microorganisms, viruses and other undesirable substances of biological origin present therein will be killed or inactivated.

The back pressure within the reaction chamber caused by the viscosity temporarily showing an increase due to the dissolution of the milk proteins may furthermore be decreased effectively without application of elevated temperatures if the shearing forces within the reaction chamber are intensified with the aid of a rotary means within said reaction chamber. Such a rotary means may be constituted for instance by a colloid mill or a serrated impeller by means of which the protein particles are quickly reduced whereby the temporary increase in viscosity is limited. It has been shown that such a size reduction is especially effective if part of the required amount of the solubilizer is added to the milk proteins on said rotary means within the reaction chamber.

It has been found that the viscosity of the milk protein suspensions is dependent of the pH-value. In general the curd shows a pH-value within the range of from 4.0 to 5.0. In the method according to the invention there are usually employed solubilizers having a neutral to alkaline reaction, for instance the above described compounds used in the known methods. Upon adding such a solubilizer to the curd there will consequently be an increase of the pH-value of the curd. It has been found that the viscosity shows a minimum at a pH-value within the range of from 5.0 to 5.3 and a maximum at a pH-value of about 5.7. Thereupon the viscosity shows a sharp decrease until the viscosity at a pH-value of 6.5 and higher will remain approximately constant. This is elucidated with reference to the enclosed figure applying to a 20% by weight dispersion of casein to which sodium hydroxide is added. This dependency of the viscosity on the pH-value is utilized in dissolving milk proteins by means of a solubilizer. Of course, immediately before feeding the milk protein suspension to the positive displacement pump there may of course be added such an amount of solubilizer, particularly a hydroxide of an alkali metal or an alkaline earth metal or of ammonium hydroxide may be added to the suspension that the pH-value thereof will be 6.5 or more. However, it appears to be advantageous to add first such an amount of solubilizer that the pH-value will be within the range of from 5.0 to 5.3. Upon arrival of the mixture in the reaction chamber, preferentially provided with a rotary means, the remaining part of the solubilizer is added quickly so that the pH-value will be at least 6.5. In this manner the viscosity problem is eliminated without causing an unacceptably high temperature.

Preferably, the adjustment of the pH-value of the suspension at a value within the range from 5.0 to 5.3 is performed at a moderately elevated temperature, for instance at a temperature of at least 60° C., in particular at a temperature in the range of from 70° to 80° C. In case of some calcium caseinates and calcium coprecipitates there will be desired a temperature below 70° C., because even within the pH-range of from 5.0 to 5.3 these substances may be subject to gelation at temperatures above 70° C.

Stable solutions of calcium caseinates and calcium coprecipitates having a relatively high dry solids content may be prepared in particular if before arrival of the milk proteins in the reaction chamber sodium hydroxide, potassium hydroxide or ammonia is added up to a pH-value within the range of 5.0 to 5.3 whereupon the reaction chamber, in particular, on a colloid mill or a serrated impeller provided in said reaction chamber calcium hydroxide is added to a pH-value of at least 6.5. The use of ammonia is preferred because the ammonia is removed upon drying the product thus obtained. Calcium caseinate powders thus obtained have a nitrogen solubility index (A.O.C.S. Method Ba 11-65) of 95-99% and contain 1-1.5% by weight of calcium based on the dry material.

By providing that the pH-value of the mixture in the volume pump is within the range from 5.0 to 5.3 by the addition of a part of the required amount of solubilizer it is even possible to convey mixtures having a rather high dry solid content, e.g. of from 32-43% by weight, by means of usual pumps without any special implements.

Where homogeneous milk protein solutions having a high dry solids content may be prepared continuously in a closed system by applying the method according to the invention it has become possible to obtain dry milk proteins of a new type. This may be elucidated as follows:

Up till now it was usual to dry milk proteins by means of spray dryers or drum dryers. When using spray dryers the solutions usually having a dry solids content of from 18-25% by weight are sprayed in the form of fine droplets in heated air. The powder thus dried consists of particles having very large hollow spaces caused by the formation of vapour bubbles within the drying droplets. Such a powder has the drawback that its bulk density is low, causing the packaging costs thereof to be rather high and that it will dissolve with difficulty. Due to the high air content of the powder particles these particles will for that matter float on the water surface where they will form tacky lumps that will dissolve only with great difficulty. When using drum dryers soluble milk proteins are obtained in the form of a film which may be reduced in size by milling. This film and the powder obtained therefrom will also possess appreciable hollow spaces caused by the escape of vapour. Consequently, the particles are wetted with difficulty and upon dissolving the dried product lumps are formed, although these problems are less serious than in case of milk proteins dried by spray drying.

There may be obtained now dry milk protein products of a novel type not having enclosed hollow spaces and, consequently, having a high bulk density and not causing problems when being dissolved in water if a solution of milk protein is prepared in the above described way within a reaction chamber provided with narrow discharge openings and the liquid jets forced through said openings of the liquid thus having a relatively high dry solid content are dried to endless threads or films, said endless threads or films optionally being subjected to a size reduction and e.g. being processed to a powder. These milk protein products have a particle density amounting to at least 90% of the specific density. When the products are brought into water they appear to swell first by the absorption of water whereupon they are converted into a homogeneous milk protein solution.

It should be remarked in this connection that it was already known per se to force suspensions of milk proteins and auxiliary substances through narrow openings be means of extrusion apparatuses and to dry the same to threads or other shaped products serving for instance for the preparation of meat substitutes. Upon mixing with water the product thus obtained will indeed absorb water whereby it acquires a meat-like structure but will remain nevertheless in an undissolved condition whereas even after a mechanical size reduction such products cannot be converted into homogeneous solutions. The auxiliary substances used in the preparation of these products are for that matter no solubilizers but agents which have to assure the insolubility of the product.

By varying the shape of the discharge opening from the reaction chamber in the method according to the invention the shape of the jet and consequently also the shape of the dried product may be influenced. Of course, it is desirable that the product should have very small dimensions in at least one direction, so that the moisture may most easily evaporate during the drying operation. The drying operation may be performed in several ways e.g. by making the jet fall freely over such a distance that the exterior thereof is dry or by collecting the jets on a solid surface or on a conveyor belt from which they are removed again by scraping after the drying is complete. The heat required for drying may be supplied in a known way for instance by heating the air used for drying, by radiation or by heating the solid surface or the conveyor belt.

The endless products thus obtained may not only be processed to a powder but may also be obtained in a shape like that of sheet gelatin that may be used in that shape for household purposes.

It is also feasible of course to dry the solutions of milk proteins having a high dry solids content discharged from the reaction chamber in a usual way e.g. with the aid of spray dryers or drum dryers. In general it applies that a smaller amount of water needs to be evaporated than required thus far.

If the soluble milk proteins prepared in accordance with the invention are not dried but processed in a dissolved condition, e.g. in the preparation of food, glue, paint or other coating layers there will be the advantage that no incorporation of air in the solution occurs, that the formation of foam is avoided and that higher dry solids contents are possible than thus far.

The invention also relates to an apparatus for performing the above described method, said apparatus being characterized by a positive displacement pump and a closed reaction chamber connected to the discharge conduit of said pump. Preferably, the volume pump is provided with a feeding screw. Within the reaction chamber there may be provided also a rotary means, such as a colloid mill or a serrated impeller. The reaction chamber may be provided with narrow discharge openings whereby it becomes feasible to obtain the product discharged from the reaction chamber in the shape of endless threads or films.

The invention will be elucidated with reference to the folowing examples.

EXAMPLE I

In this example there was employed a Mono pump of the type ST 620 which pump was provided with a feed channel including a screw and was connected to a pipe having a diameter of 2.5 cm and a total length of 9 m, Said pipe serving as the reaction chamber. At its end the reaction chamber was provided with a valve serving as a throttle. At the suction opening of the pump there were provided an inlet conduit for injecting steam as well as a supply conduit for supplying solubilizer. Likewise the reaction chamber was provided with an inlet conduit for injecting steam.

To the pump there was supplied an acid casein curd having a dry solids content of 50% by weight at a rate of 220 kg per hour. A 33% by weight aqueous solution of sodium hydroxide was used as the solubilizer. This solution was metered in such a way that the pH-value was from 6.8 to 6.9. The steam supply was regulated in such manner that the temperature of the mixture transferred from the pump to the reaction chamber was from 60° to 65° C. and that the temperature of the solution discharged from the reaction chamber was from 80° to 85° C. A homogeneous caseinate solution having a dry solids content from 44 to 47% by weight was obtained. The solution was dried by means of drum dryers.

Upon increasing the productivity by raising the number of revolutions of the pump under otherwise the same conditions it appeared that likewise homogeneous caseinate solutions were obtained even at a productivity of 1000 kg per hour and more.

Similar results were obtained when employing the same equipment, in which the length of the reaction chamber was, however, shortened. In that instance the diameter of the reaction chamber was constricted on one or more locations by providing flanges having circular or slot-like holes. Homogeneous solutions could be obtained when employing a reaction chamber having a smaller volume and consequently at a shorter residence time than those in the above described embodiment if the constrictions yielded a comparable resistance within the reaction chamber.

EXAMPLE II

As the apparatus a supply tank provided with an agitating device was used, which supply tank was connected to a Waukesha volume cap (series No. 1191 SS, size 30), the discharge of the volume pump being connected to a colloid mill (Probst Class PUC E/GL, type K 100). Both the supply tank and the colloid mill were provided with a supply conduit for supplying a sodium hydroxide solution.

Dry acid casein having a dry solids content of 90% by weight was fed to the supply tank at a rate of 150 kg per hour to which tank there was also supplied water at a temperature of 70° C. at a rate of 250 kg per hour as well as a 16% by weight aqueous solution of sodium hydroxide at such a rate that the pH-value of the suspension was 5.2. To the colloid mill there was subsequently supplied a 16% by weight aqueous solution of sodium hydroxide at such a rate that the pH-value of the mixture was 6.7. Under these circumstances a homogeneous sodium caseinate solution having a dry solids content of 33% by weight was obtained. This solution was dried with the aid of a spray dryer.

EXAMPLE III

The same apparatus as described in example II was used. To the supply tank an acid casein curd having a dry solids content of 45% by weight was fed at a rate of 300 kg per hour as well as water at a temperature of 70° C. at a rate of 100 kg per hour. To said tank also a 22% by weight aqueous solution of potassium hydroxide was supplied at such a rate that the pH-value of the suspension was 5.2. To the colloid mill a similar KOH-solution until the mixture reached a pH-value of 6.7.

Under these circumstances a homogeneous potassium caseinate solution having a dry solids content of 33% was obtained.

Under comparable circumstances but substituting the potassium hydroxide by ammonium hydroxide an ammonium caseinate solution was obtained.

EXAMPLE IV

The apparatus as described in example II was used. To the supply tank an acid casein curd having a dry solids content of 45% by weight was fed at a rate of 150 kg per hour as well as water at a temperature of 70° C. at a rate of 230 kg per hour. To said tank furthermore 25% by weight ammonia was fed at such a rate that the suspension reached a pH-value of 5.2. To the colloid mill a suspension of 15% by weight lime milk in water was supplied at such a rate that the pH-value of the mixture was 6.7.

Under these circumstances a homogeneous calcium caseinate solution having a dry solids content of 33% by weight and a calcium content of 1.2% by weight based on the dry solids was obtained.

EXAMPLE V

The same apparatus as described in example II was used. To the supply tank a milk coprecipitate curd having a dry solids content of 42% by weight was fed at a rate of 105 kg per hour as well as water at a temperature of 70° C. at a rate of 95 kg per hour. The supply of a 16% by weight aqueous solution of sodium hydroxide to said tank was regulated in such a manner that a suspension reached a pH-value of 5.2. A similar sodium hydroxide solution was fed to the colloid mill at such a rate that the pH-value of 6.7 was reached.

Under these circumstances a homogeneous sodium coprecipitate solution having a dry solids content of 32% by weight was obtained.

EXAMPLE VI

While using the apparatus as described in example I in which, however, a tube-like reaction chamber having a capacity of 50 liters was used a sodium caseinate solution having a dry solids content of from 46–48% by weight was prepared. The pressure within the reaction chamber was controlled by means of a throttle at the discharge side. By injecting steam the temperature within the reaction chamber was kept at 120° C. Under these circumstances a sodium caseinate solution was prepared at a rate of 1200 kg per hour in which solution no living micro-organisms could be detected.

EXAMPLE VII

In accordance with the operational embodiment described in example I a sodium caseinate solution having a dry solids content of 45% by weight at a temperature of 95° was prepared. The homogenous solution was discharged from the reaction chamber through circular apertures while forming jets having a diameter of 0.5 mm. These jets were dried with the aid of hot air to form threads of sodium caseinate. The threads obtained consisted of a clear translucent material containing no enclosed cavities and having a specific weight of 1.3. By milling these threads a powder having a particle density equalling this specific density was obtained. Consequently the powder appeared to be very well wettable and soluble in water.

We claim:

1. A continuous method for dissolving milk proteins containing water insoluble casein comprising (a) simultaneously admixing said milk proteins with at least one solubilizer and with water, (b) passing the milk proteins, the solubilizer, and the water in a continuous stream through a closed reaction chamber by means of a positive displacement pump, and (c) converting the mixture within said reaction chamber under the influence of shearing forces at a temperature of at least 60° C. and at a final pH value of at least 6.5 into a solution having a dry solids content within the range of from 27 to 60% by weight.

2. The method of claim 1, wherein said pump is a volume pump having an added feeding screw.

3. The method of claims 1 and 2, wherein the shearing forces within the reaction chamber are generated solely by friction with respect to stationary surfaces.

4. The method of claims 1 or 2, wherein the shearing forces are intensified by the use of rotary means selected from the group consisting of a colloid mill and a serrated impeller, within said reaction chamber.

5. The method of claim 1 wherein said solubilizer has an alkaline reaction such that before arriving in the reaction chamber the milk proteins are admixed with an alkaline solubilizer until a pH-value of from 5.0 to 5.3 is reached whereupon within said reaction chamber such an amount of alkaline solubilizer is added that the pH-value of the mixture will be at least 6.5.

6. The method of claim 1, wherein the milk proteins before arriving in the reaction chamber are admixed with ammonium hydroxide up to a pH-value of from 5.0 to 5.3 whereupon within the reaction chamber calcium hydroxide is added up to a pH-value of at least 6.5.

7. The method of claim 5, wherein the mixture is kept at a temperature of from 70° to 80° C.

8. The method of claims 1 or 2 wherein the temperature within the reaction chamber is adjusted by the direct injection of steam.

9. The method of claim 1 wherein the residence time, the temperature and the pressure within the reaction chamber are kept constant during the continuous dissolving operation.

10. The method of claim 1 wherein the mixture is kept at a temperature above 120° C. within the reaction chamber for a period of time such that micro-organisms, viruses and other undesirable substances of biological origin are killed or inactivated.

11. The method of claim 1 wherein the residence time and the temperature within the reaction chamber are adjusted in such a manner that the thermal deterioration of the proteins will be no more serious than that corresponding to a residence time of 120 seconds at a temperature of 80° C.

12. The method of claims 1, or 2, wherein the solutions obtained are dried to a dry solids content of at least 90% by weight.

13. The method of claims 1, or 2, wherein the solution obtained in the reaction chamber is discharged from said reaction chamber by means of at least one narrow discharge opening, whereupon the liquid jets forced through said opening are dried while forming endless threads or films which are then cut or milled.

14. The method of claim 5, wherein the alkaline solubilizer is added within said reaction chamber while the shearing forces are intensified by the use of rotary means selected from the group consisting of a colloid mill and a serrated impeller.

15. The method of claim 6, wherein calcium hydroxide is added within the reaction chamber, while the shearing forces are intensified by the use of rotary means selected from the group consisting of a colloid mill and a serrated impeller.

16. The water-soluble milk protein product which is prepared according to the method of claim 12 and then forced through narrow openings and dried to endless threads or films which can be processed into a powder having a particle density amounting to at least 90% of the specific density of the milk protein itself.

17. The water-soluble milk protein product prepared according to the method of claim 13 and having a particle density amounting to at least 90% of the specific density of the milk protein itself.

* * * * *

UNITED STATES PATENT AND TRADEMARK OFFICE
CERTIFICATE OF CORRECTION

PATENT NO. : 4,407,747
DATED : October 4, 1983
INVENTOR(S) : Frank Lippe, et al.

It is certified that error appears in the above-identified patent and that said Letters Patent are hereby corrected as shown below:

Cover page of patent, change "Assignee: Stichting Nederlands Instituut Voor Zuivelonderzoek (NIZO), Netherlands"

to -- Assignees: Stichting Nederlands Instituut Voor Zuivelonderzoek (NIZO) and DMV-Campina B.V., Netherlands --.

Signed and Sealed this

Tenth Day of July 1984

[SEAL]

Attest:

GERALD J. MOSSINGHOFF

*Attesting Officer*     *Commissioner of Patents and Trademarks*